(12) United States Patent
Shin et al.

(10) Patent No.: US 8,571,103 B2
(45) Date of Patent: Oct. 29, 2013

(54) SCALABLE VIDEO DECODER AND CONTROLLING METHOD FOR THE SAME

(75) Inventors: Il Hong Shin, Daejeon (KR); Jeong Ju Yoo, Daejeon (KR); Jin Woo Hong, Daejeon (KR); Jong Soo Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1005 days.

(21) Appl. No.: 12/269,920

(22) Filed: Nov. 13, 2008

(65) Prior Publication Data

US 2010/0020874 A1    Jan. 28, 2010

(30) Foreign Application Priority Data

Jul. 23, 2008    (KR) .................. 10-2008-0071563

(51) Int. Cl.
*H04N 11/02*        (2006.01)
*H04N 7/26*         (2006.01)

(52) U.S. Cl.
CPC .................. *H04N 7/26255* (2013.01)
USPC .................. 375/240.13; 375/240.16

(58) Field of Classification Search
USPC .................. 375/240.13, 240.16
See application file for complete search history.

(56) References Cited

U.S. PATENT DOCUMENTS

2006/0126962 A1*   6/2006  Sun ....................... 382/268
2006/0238653 A1*  10/2006  Tobita ..................... 348/581
2007/0274389 A1*  11/2007  Kim et al. ............. 375/240.16
2008/0219572 A1*   9/2008  Kim et al. ................ 382/236
2008/0310512 A1*  12/2008  Ye et al. ............... 375/240.16

FOREIGN PATENT DOCUMENTS

| KR | 1020060063533 A | 6/2006 |
| KR | 1020070012201 A | 1/2007 |
| KR | 1020070090273 A | 9/2007 |
| KR | 1020070095180 A | 9/2007 |

* cited by examiner

*Primary Examiner* — Mark Rinehart
*Assistant Examiner* — Matthew Hopkins
(74) *Attorney, Agent, or Firm* — Ladas & Parry LLP

(57) ABSTRACT

A scalable video decoder and a controlling method thereof are provided. A method of controlling a scalable video decoder includes: determining whether a macro block mode of an upper layer is an interlayer prediction mode when decoding a scalable video; when the macro block mode of the upper layer is determined as the interlayer prediction mode, determining an up-sampling operation is required to thereby either perform texture up-sampling using corresponding macro block information of a lower layer and neighboring pixel information, or perform residual up-sampling using the corresponding macro block information of the lower layer; and decoding the upper layer using the texture up-sampling or the residual up-sampling.

16 Claims, 6 Drawing Sheets

SCALABLE VIDEO DECODER AND CONTROLLING METHOD FOR THE SAME

CROSS-REFERENCE TO RELATED APPLICATION

This application claims priority from Korean Patent Application No. 10-2008-0071563, filed on Jul. 23, 2008, in the Korean Intellectual Property Office, the entire disclosure of which is incorporated herein by reference.

BACKGROUND OF THE INVENTION

1. Field of the Invention

The present invention relates to a scalable video decoder and a controlling method thereof, and more particularly, to a scalable video decoder that can reduce the usage amount of a memory when up-sampling a video block in scalable decoding of an image signal, and a controlling method thereof.

2. Description of Related Art

A scalable video codec (SVC) scheme denotes a scheme that encodes an image signal to the best quality. Also, although a partial sequence of resultantly generated picture sequence, that is, a sequence of a frame that is partially selected from all sequences, is decoded and used, the SVC scheme enables low quality video expression.

A hierarchical B picture (H-B picture) scheme is an encoding scheme that is proposed to be used for the above SVC.

The picture sequence, encoded using the H-B picture corresponding to the SVC scheme, receives and processes only the partial sequence to thereby enable the low quality video expression. However, when a bitrate is decreased, the quality may be even more degraded. In order to solve this problem, it is possible to hierarchically provide separate auxiliary picture sequences with a low transmission bitrate, for example, picture sequences with a low frame rate per second.

Also, up-sampling or down-sampling of an image may be required in order to simultaneously transmit a large image and a small image. Specifically, it is possible to encode a single image signal source into each of a four common intermediate format (CIF) picture sequence, a CIF picture sequence, and a quarter common intermediate format (QCIF) picture sequence, and transmit the encoded picture sequences to a decoding apparatus.

Since both an upper layer and a lower layer encode the same image signal source, redundancy exists in the encoded signal of both the upper layer and the lower layer.

Therefore, in order to increase a coding rate of a particular layer that is encoded according to a scheme of transmitting various types of screen sizes, an image frame of a current layer at the same point in time as an image frame of a lower layer is created as a predicted image, that is, residual data based on the image frame of the lower layer. For example, when encoding a current macro bloc of a high resolution image into an intra BL mode, a corresponding macro block of the lower layer, that is, a block including a region that corresponds to the same time as the current macro block and also corresponds to the same location in a frame is up-sampled and then a difference value between pixel values of the up-sampled block or an error value is encoded in the current macro block.

The up-sampled block is not transmitted to a decoder. Thus, so that the decoder may decode the encoded macro block, the decoder must up-sample a corresponding macro block of the lower layer and use the up-sampled macro block. The corresponding macro block of the lower block needs to be up-sampled not only for encoding the macro block of the intra BL mode, but also for performing a residual data prediction operation between layers.

As described above, when providing a plurality of layers with a different picture size or resolution from encoding streams, there is a need for up-sampling an image block during an encoding and decoding process.

SUMMARY OF THE INVENTION

An aspect of the present invention provides a scalable video decoder and a controlling method thereof that can inspect a mode of a current macro block and determine whether it is required to enlarge, that is, up-sample an image when decoding a small size screen (lower layer) and then decoding a large size screen (upper layer) using characteristics of a single-loop-decoding mode of H.264 scalable video codec (SVC), and can perform an image up-sampling operation using macro block information of a lower layer and only a portion of neighboring pixels when texture up-sampling or residual up-sampling is required, and thereby reducing a required amount of memory used.

According to an aspect of the present invention, there is provided a method of controlling a scalable video decoder, the method including: determining whether a macro block mode of an upper layer is an interlayer prediction mode when decoding a scalable video; when the macro block mode of the upper layer is determined as the interlayer prediction mode, determining an up-sampling operation is required to thereby either perform texture up-sampling using corresponding macro block information of a lower layer and neighboring pixel information, or perform residual up-sampling using the corresponding macro block information of the lower layer; and decoding the upper layer using the texture up-sampling or the residual up-sampling.

In this instance, the neighboring pixel information may include information associated with four pixels adjacent to the corresponding macro block.

Also, the performing of the texture up-sampling or the residual up-sampling may include performing texture up-sampling by copying the corresponding macro block of the lower layer and two pixels adjacent to the corresponding macro block in a 20×20 memory and using a 4-tap texture up-sampling filter.

Also, the performing of the texture up-sampling or the residual up-sampling may include performing residual up-sampling by copying a residual value of the corresponding macro block of the lower layer in a 16×16 memory and using a 2-tap residual up-sampling filter.

Also, the performing of the texture up-sampling or the residual up-sampling may include performing image up-sampling by performing horizontal convolution and then performing vertical convolution, or by performing vertical convolution and then performing horizontal convolution.

Also, the upper layer may be two times as wide and two times as long as the lower layer.

According to another aspect of the present invention, there is provided a scalable video decoder including: a macro block mode decision unit to determine whether a macro block mode of an upper layer is an interlayer prediction mode when decoding a scalable video; an up-sampling unit to determine, when the macro block mode of the upper layer is determined as the interlayer prediction mode, an up-sampling operation is required to thereby either perform texture up-sampling using information corresponding macro block information of a lower layer and neighboring pixel information, or to perform residual up-sampling using the corresponding macro block information of the lower layer; and a decoding unit to decode the upper layer using the texture up-sampling or the residual up-sampling.

Advantageous Effect

According to the present invention, when decoding a small size screen (lower layer) and then decoding a large size screen (upper layer) using characteristics of a single-loop-decoding mode of H.264 scalable video codec (SVC), it is possible to inspect a mode of a current macro block and determine whether it is required to enlarge, that is, up-sample an image. As a result of the determination, when texture up-sampling or residual up-sampling is required, it is possible to perform an image up-sampling operation using macro block information of a lower layer and only a portion of neighboring pixels. Through this, it is possible to reduce a required amount of memory used.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
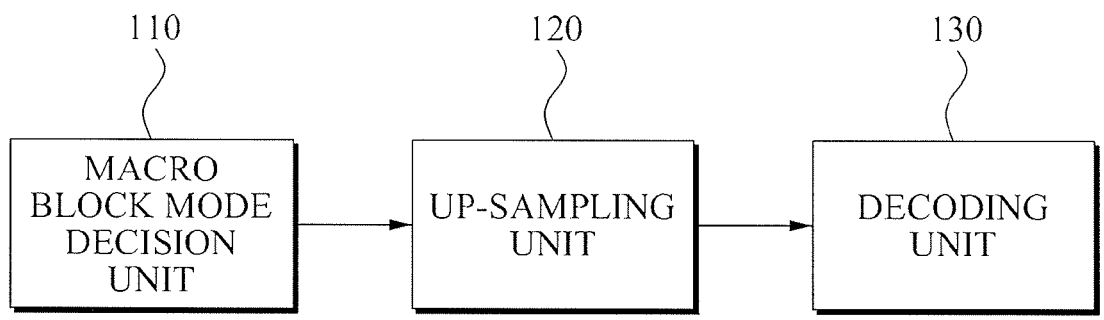
FIG. 1 is a block diagram illustrating a configuration of a scalable video decoder according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a configuration of a scalable video decoder according to an embodiment of the present invention. The scalable video decoder includes a block mode decision unit 110, an up-sampling unit 120, and a decoding unit 130.

The macro block mode decision unit 110 may determine whether a macro block mode of an upper layer is an interlayer prediction mode when decoding a scalable video.

When the macro block mode of the upper layer is determined as the interlayer prediction mode, the up-sampling unit 120 may determine an up-sampling operation is required to thereby perform the up-sampling operation.

In this instance, the up-sampling unit 120 may perform texture up-sampling using corresponding macro block information of a lower layer and neighboring pixel information, or may perform residual up-sampling using the corresponding macro block information of the lower layer.

In particular, when the up-sampling unit 120 performs texture up-sampling, the up-sampling unit 120 may perform up-sampling based on information associated with four pixels adjacent to the corresponding macro block. In this instance, the up-sampling unit 120 may perform texture up-sampling by copying the corresponding macro block of the lower layer and two pixels adjacent to the corresponding macro block in a 20×20 memory and using a 4-tap texture up-sampling filter.

Also, the up-sampling unit 120 may perform residual up-sampling by copying a residual value of the corresponding macro block of the lower layer in a 16×16 memory and using a 2-tap residual up-sampling filter.

Also, the up-sampling unit 120 may perform image up-sampling by performing horizontal convolution and then performing vertical convolution, or by performing vertical convolution and then performing horizontal convolution.

The above process may be applicable when the upper layer is two times as wide and two times as long as the lower layer.

The decoding unit 130 may decode the upper layer using the texture up-sampling or the residual up-sampling.

Therefore, when decoding the upper layer, it is possible to reduce a required usage amount of a memory through a process of inspecting a current macro block mode, determining whether up-sampling of an image is required, and when texture up-sampling or residual up-sampling is required as a result of the determination, performing an image up-sampling operation using macro block information of a lower layer and only a portion of neighboring pixels.

Figure 2:
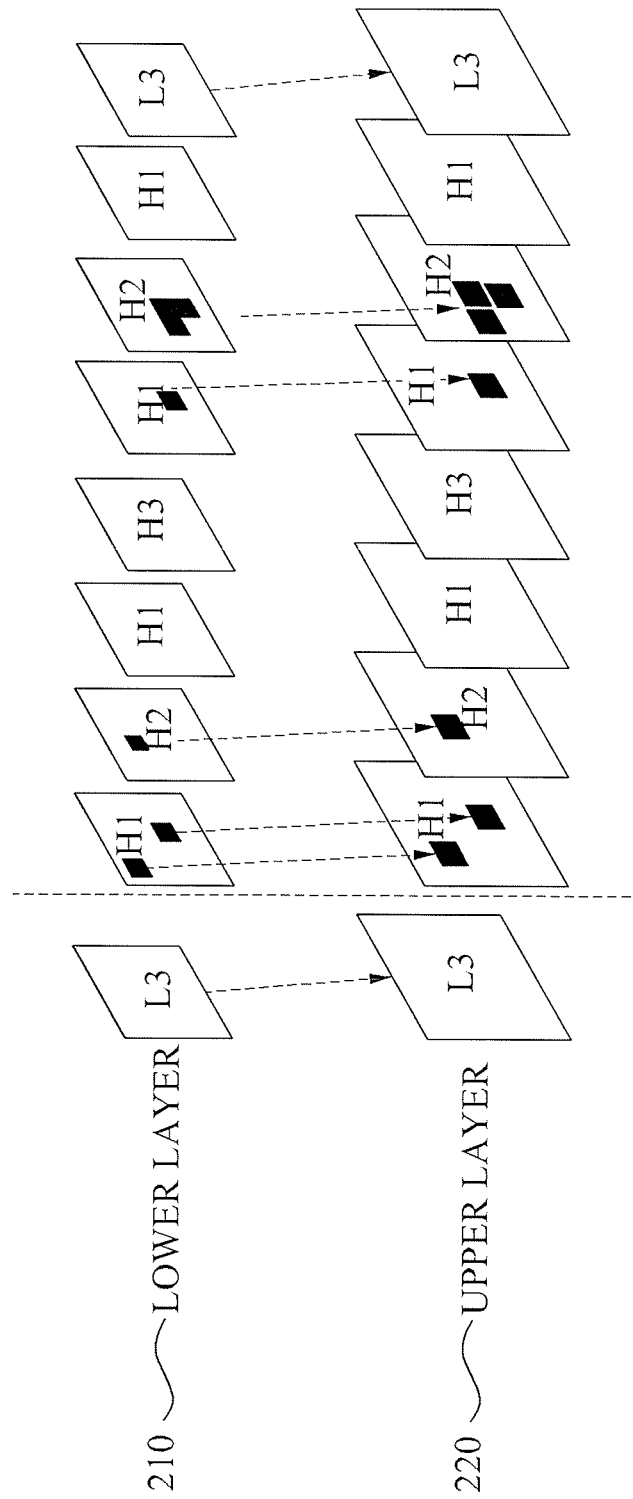
FIG. 2 illustrates a scheme of up-sampling only a block coded using an intra LB mode among macro blocks of a lower layer according to an embodiment of the present invention.

FIG. 2 illustrates a scheme of performing an up-sampling operation for only a block coded using an intra BL mode among macro blocks of a lower layer according to an embodiment of the present invention. Hereinafter, the above scheme will be described with reference to FIG. 2.

The up-sampling operation of the image is an essential operation for an SVC encoder/decoder. H.264 SVC, currently in a standardization process, adopts a single-loop-decoding scheme. The single-loop-decoding scheme denotes a scheme that performs the up-sampling operation for only the intra BL mode coded block among macro blocks of a lower layer 210 with the small size screen to thereby use as a prediction signal for reconstruction of the intra mode of a current layer. Accordingly, the encoder/decoder may effectively perform the image up-sampling operation using characteristics of a single-loop-decoding mode.

Also, coding modes I_16×16, I_4×4, P_16×16, P_8×8, etc., of existing H.264 and encoding modes of SVC base_mode_flag, residual_prediction_flag, etc. may be simultaneously applicable to an upper layer 220. Therefore, when decoding the upper layer 220, it is possible to inspect an encoding mode and determine whether to reuse information of the lower layer 210. Through this, it is possible to reduce a required memory capacity.

Figure 3:
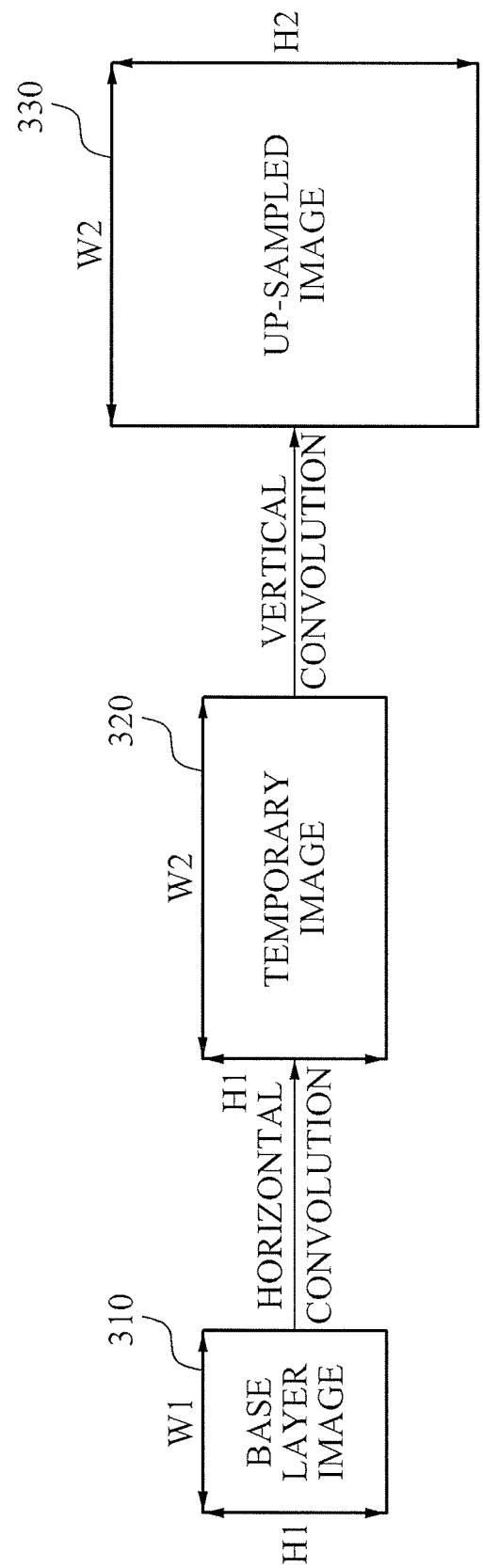
FIG. 3 illustrates a scheme of up-sampling an image according to an embodiment of the present invention.

FIG. 3 illustrates a scheme of up-sampling an image according to an embodiment of the present invention. The image up-sampling scheme will be described with reference to FIG. 3.

As shown in FIG. 3, a horizontal and vertical convolution process using a filter may be performed using a base layer image 310 corresponding to a restored image of a lower layer.

A temporary image 320 corresponding to a horizontally up-sampled image, that is, enlarged image may be created by performing horizontal convolution for the base layer image

310. An up-sampled image 330 may be created by performing vertical convolution for the temporary image 320.

In this instance, although an order of the horizontal convolution and the vertical convolution is changed, the same result may be obtained.

Specifically, up-sampling may be performed by performing, via a filter, horizontal convolution and vertical convolution for the base layer image 310 corresponding to the restored image of the lower layer. In particular, up-sampling may be performed by initially performing the horizontal convolution and then performing the vertical convolution. Conversely, up-sampling may be performed by performing the vertical convolution and then performing the horizontal convolution.

When performing up-sampling for the lower layer, up-sampling corresponding to enlargement may be performed by setting a predetermined multiple of the lower layer as a ratio.

Figure 4:
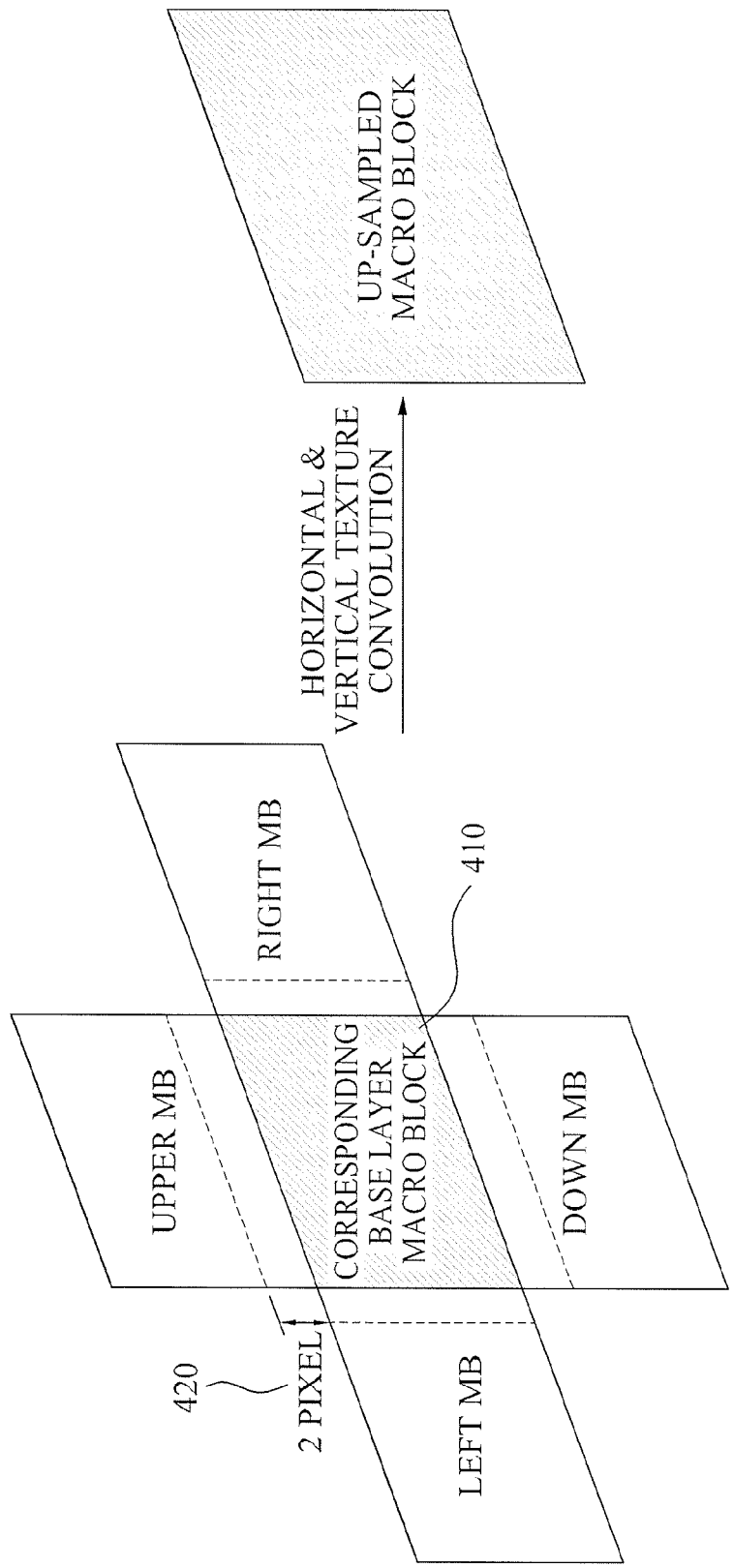
FIG. 4 illustrates a scheme of performing texture up-sampling using corresponding macro block information of a lower layer and neighboring pixel information according to an embodiment of the present invention.

FIG. 4 illustrates a scheme of performing texture up-sampling using corresponding macro block information of a lower layer and neighboring pixel information according to an embodiment of the present invention. Hereinafter, the texture up-sampling scheme will be described with reference to FIG. 4.

When an interlayer prediction mode of an upper layer requires the texture up-sampling, the texture up-sampling may be performed based on information associated with a corresponding base layer macro block 410 corresponding to a corresponding macro block of a lower layer and pixels 420 adjacent to the corresponding macro block.

More specifically, texture up-sampling may be performed by copying the corresponding macro block of the lower layer, that is, the corresponding base layer corresponding macro block, and the adjacent two pixels 420 in a 20×20 memory and using a 4-tap texture up-sampling filter.

In this instance, when performing two-dimensional up-sampling in a decoder, an order of vertical convolution and horizontal convolution may be randomly performed. Therefore, a 20×20 memory may be required.

Figure 5:
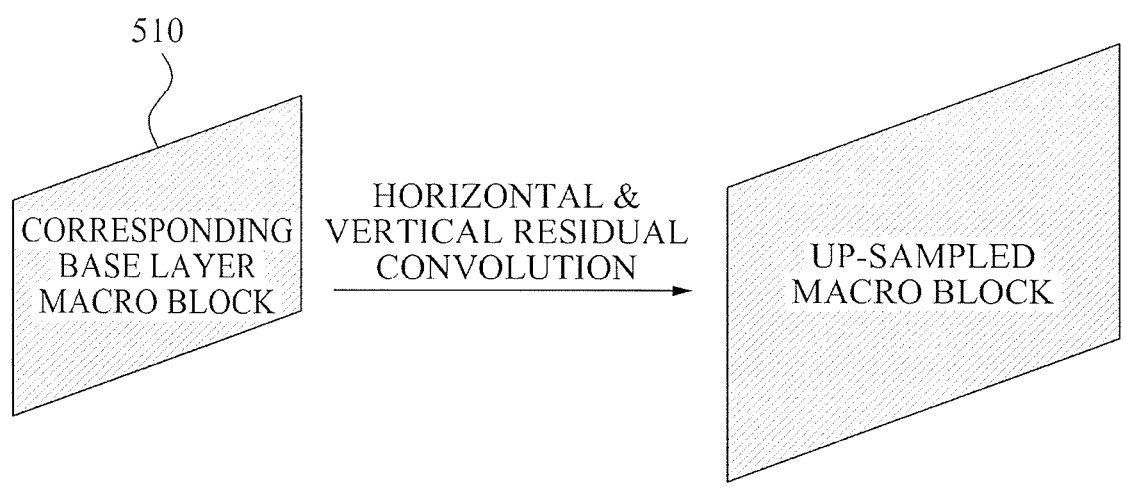
FIG. 5 illustrates a scheme of performing residual up-sampling using corresponding macro block information of a lower layer according to an embodiment of the present invention.

FIG. 5 illustrates a scheme of performing residual up-sampling using corresponding macro block information of a lower layer according to an embodiment of the present invention. Hereinafter, the residual up-sampling scheme will be described with reference to FIG. 5.

When an interlayer prediction mode of an upper layer requires the residual up-sampling, the residual up-sampling may be performed based on information associated with a corresponding base layer macro block 510 corresponding to a corresponding macro block of a lower layer.

More specifically, residual up-sampling may be performed by copying a residual value of the corresponding macro block 510 of the lower layer, that is, the corresponding base layer of the corresponding macro block, in a 16×16 memory and using a 2-tap residual up-sampling filter. In this instance, an appropriate padding operation may be performed in a block boundary according to H.264 SVC standard.

Unlike the existing scheme that requires texture and residual up-sampling information corresponding to the image size of the upper layer, the present invention shown in FIGS. 4 and 5 requires only additional memories, a 40×40 memory and a 32×32 memory that are two fold of the 20×20 memory and the 16×16 memory. In particular, in the case of high quality decoding of a high definition (HD) class, a required usage amount of memory may be significantly reduced in comparison to the existing scheme.

Figure 6:
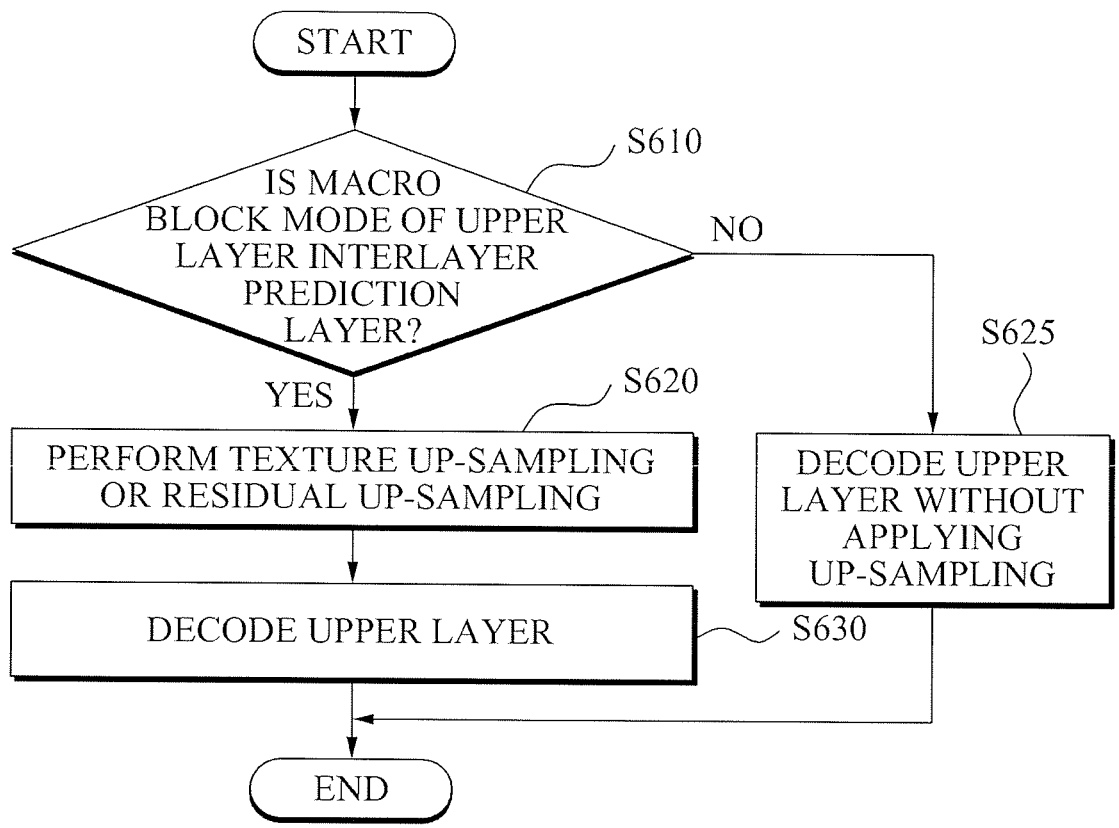
FIG. 6 is a flowchart illustrating a method of controlling a scalable video decoder according to an embodiment of the present invention.

FIG. 6 is a flowchart illustrating a method of controlling a scalable video decoder according to an embodiment of the present invention. Hereinafter, the method of controlling the scalable video decoder will be described with reference to FIG. 6.

In operation S610, when decoding a scalable video, the method may determine whether a macro block mode of an upper layer is an interlayer prediction mode.

In operation S620, when the macro block mode of the upper layer is determined as the interlayer prediction mode, the method may determine an up-sampling operation is required to thereby perform the up-sampling operation.

In this instance, the method may perform texture up-sampling using corresponding macro block information of a lower layer and neighboring pixel information, or may perform residual up-sampling using the corresponding macro block information of the lower layer.

In particular, when the method performs texture up-sampling, the method may perform up-sampling based on information associated with four pixels adjacent to the corresponding macro block. In this instance, the method may perform texture up-sampling by copying the corresponding macro block of the lower layer and two pixels adjacent to the corresponding macro block in a 20×20 memory and using a 4-tap texture up-sampling filter.

Also, the method may perform residual up-sampling by copying a residual value of the corresponding macro block of the lower layer in a 16×16 memory and using a 2-tap residual up-sampling filter.

Also, the method may perform image up-sampling by performing horizontal convolution and then performing vertical convolution, or by performing vertical convolution and then performing horizontal convolution. The above process may be applicable when the upper layer is two times as wide and two times as long as the lower layer.

In operation S630, the method may decode the upper layer using the texture up-sampling or the residual up-sampling.

Conversely, when the macro block mode of the upper layer is not the interlay prediction mode, the method may decode the upper layer without applying a separate up-sampling operation.

Therefore, when decoding the upper layer, it is possible to reduce a required usage amount of a memory through a process of inspecting a current macro block mode, determining whether up-sampling of an image is required, and when texture up-sampling or residual up-sampling is required as a result of the determination, performing an image up-sampling operation using macro block information of a lower layer and only a portion of neighboring pixels.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling a scalable video decoder, the method comprising:
    determining whether a macro block mode of a macro block of an upper layer is an interlayer prediction mode when decoding a scalable video;
    when the macro block mode of the upper layer is determined as the interlayer prediction mode, determining an up-sampling operation is required to thereby either perform texture up-sampling using corresponding macro block information of a corresponding lower layer macro block and neighboring pixel information; and decoding the upper layer using the texture up-sampling,
wherein the neighboring pixel information comprises information associated with only a subset of pixels within a macro block adjacent the corresponding lower layer macro block, and wherein said subset of pixels are immediately adjacent said corresponding lower layer macro block, wherein said subset is less than all pixels within the adjacent macro block.

2. The method of claim 1, wherein the subset of pixels are four pixels adjacent to the corresponding lower layer macro block.

3. The method of claim 1, wherein the performing of the texture up-sampling comprises performing texture up-sampling by copying the corresponding macro block of the lower layer and two pixels adjacent to the corresponding macro block in a 20 pixels×20 pixels memory and using a 4-tap texture up-sampling filter.

4. The method of claim 1, wherein the performing of the texture up-sampling comprises performing image up-sampling by performing horizontal convolution and then performing vertical convolution, or by performing vertical convolution and then performing horizontal convolution.

5. The method of claim 1, wherein the upper layer is two times as \-vide and two times as long as the lower layer.

6. The method of claim 1, wherein the neighboring pixel information comprises information associated with only a subset of pixels within macro blocks adjacent four sides of the corresponding lower layer macro block, and wherein said subset of pixels are immediately adjacent said corresponding lower layer macro block.

7. A scalable video decoder comprising:
a macro block mode decision unit to determine whether a macro block mode of a macro block of an upper layer is an interlayer prediction mode when decoding a scalable video;
an up-sampling unit to determine, when the macro block mode of the upper layer is determined as the interlayer prediction mode, an up-sampling operation is required to thereby perform texture up-sampling using information of a corresponding lower layer macro block and neighboring pixel information; and
a decoding unit to decode the upper layer using the texture up-sampling,
wherein the neighboring pixel information comprises information associated with only a subset of pixels within a macro block adjacent the corresponding lower layer macro block, and wherein said subset of pixels are immediately adjacent said corresponding lower layer macro block, wherein said subset is less than all pixels within the adjacent macro block.

8. The decoder of claim 7, wherein the subset of pixels are pixels adjacent to the corresponding lower layer macro block.

9. The decoder of claim 7, wherein the up-sampling unit performs texture up-sampling by copying the corresponding macro block of the lower layer and two pixels adjacent to the corresponding macro block in a 20 pixels×20 pixels memory and using a 4-tap texture up-sampling filter.

10. The decoder of claim 7, wherein the up-sampling unit performs image up-sampling by performing horizontal convolution and then performing vertical convolution, or by performing vertical convolution and then performing horizontal convolution.

11. The decoder of claim 7, wherein the upper layer is two times as wide and two times as long as the lower layer.

12. A method of controlling a scalable video decoder, the method comprising:
determining whether a macro block mode of a macro block of an upper layer is an interlayer prediction mode when decoding a scalable video;
when the macro block mode of the upper layer is determined as the interlayer prediction mode, determining an up-sampling operation is required to thereby perform texture up-sampling using corresponding macro block information of a corresponding lower layer macro block and neighboring pixel information;
decoding the upper layer using the texture up-sampling; and
when the macro block mode of the upper layer is determined to not be the interlayer prediction mode, decoding the upper layer without applying a separate up-sampling operation,
wherein the neighboring pixel information comprises information associated with only a subset of pixels within a macro block adjacent the corresponding lower layer macro block, and wherein said subset of pixels are immediately adjacent said corresponding lower layer macro block, wherein said subset is less than all pixels within the adjacent macro block.

13. The method of claim 12, wherein the subset of pixels are four pixels adjacent to the corresponding lower layer macro block.

14. The method of claim 12, wherein the performing of the texture up-sampling comprises performing texture up-sampling by copying the corresponding macro block of the lower layer and two pixels adjacent to the corresponding macro block in a 20 pixels×20 pixels memory and using a 4-tap texture up-sampling filter.

15. The method of claim 12, wherein the performing of the texture up-sampling comprises performing image up-sampling by performing horizontal convolution and then performing vertical convolution, or by performing vertical convolution and then performing horizontal convolution.

16. The method of claim 12, wherein the upper layer is two times as wide and two times as long as the lower layer.

* * * * *